Nov. 9, 1965   M. B. STULL   3,216,630
CLOSURE FOR CONTAINERS
Filed March 8, 1963   2 Sheets-Sheet 2
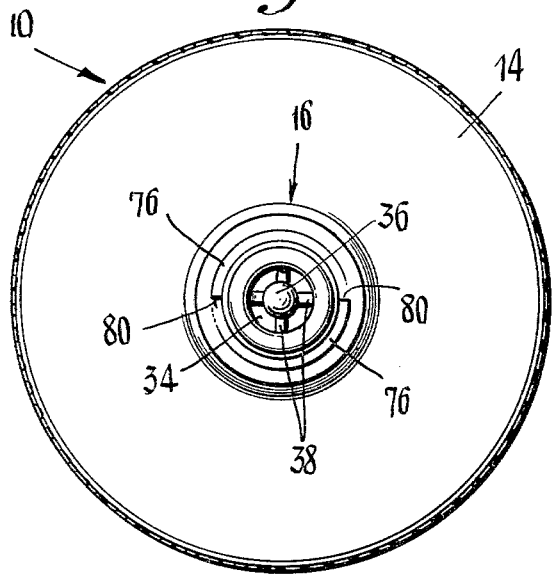
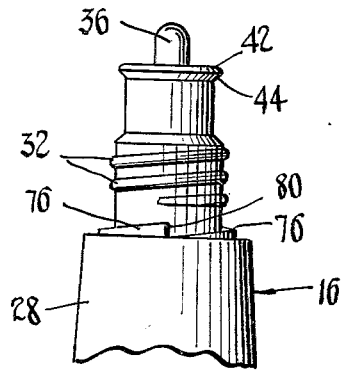
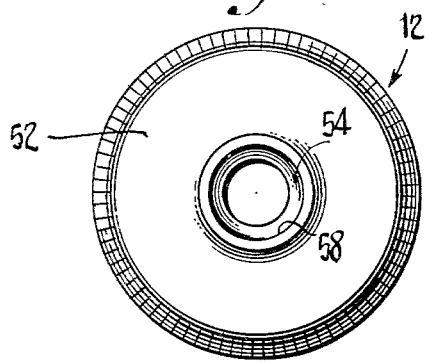
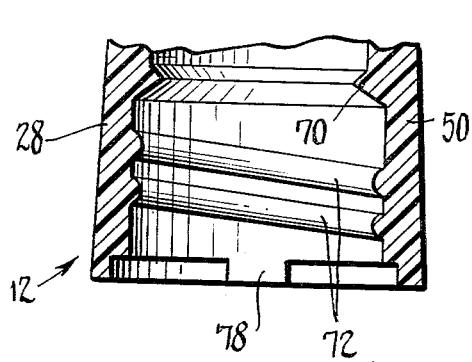
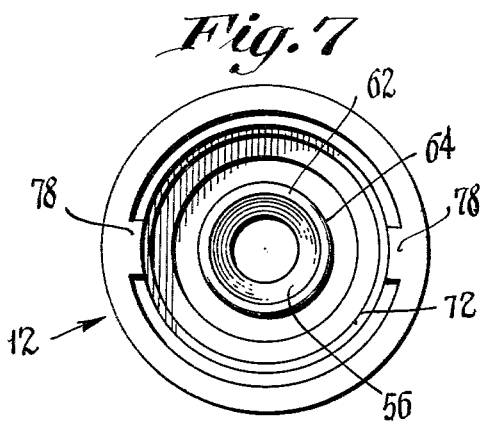
INVENTOR.
Morton B. Stull
BY
H. Gilmer Lehmann
AGENT

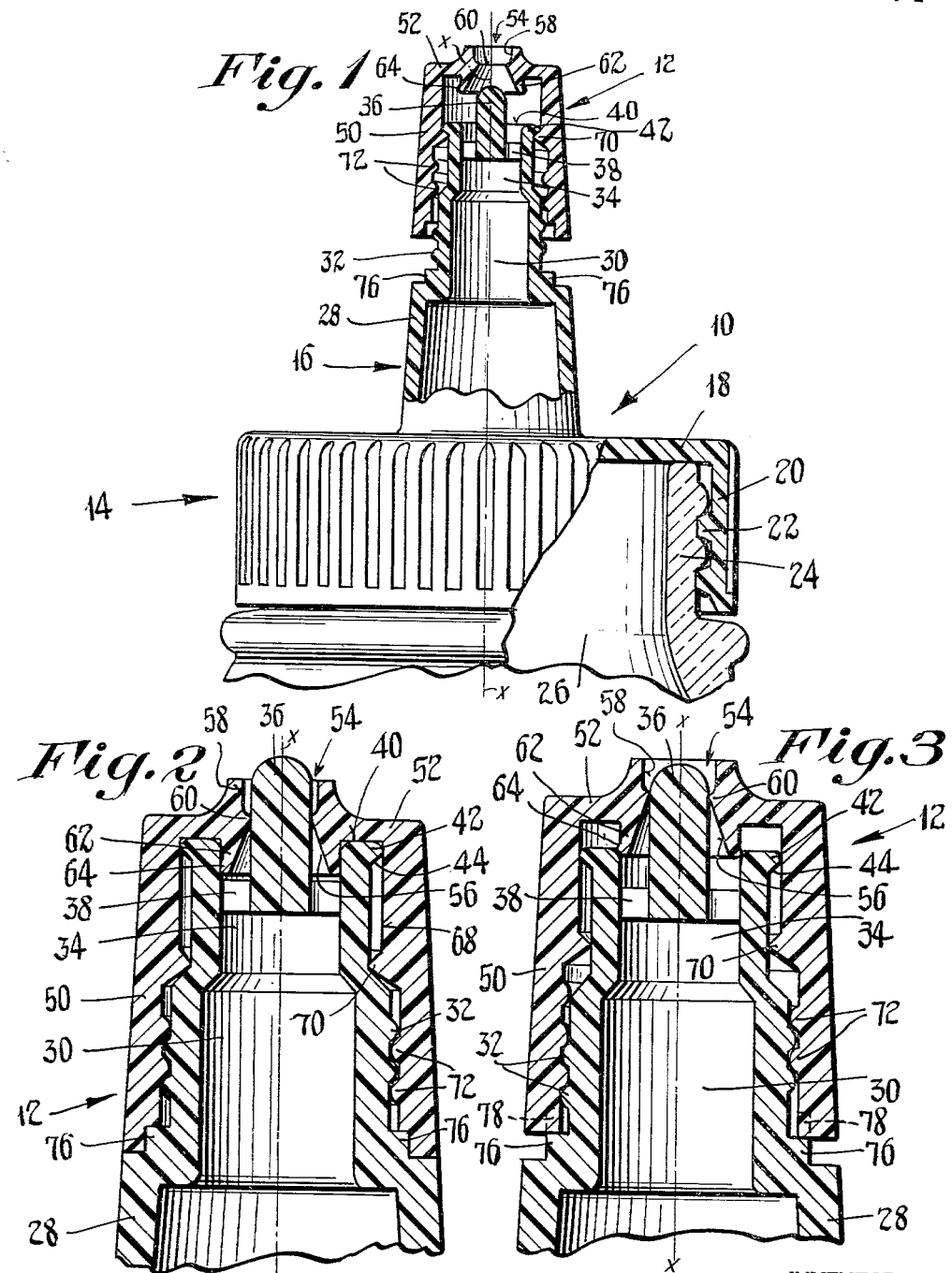

United States Patent Office 3,216,630
Patented Nov. 9, 1965

3,216,630
CLOSURE FOR CONTAINERS
Morton B. Stull, Boonton, N.J. (% Stull Engraving Co., 221–223 Banta Ave., Garfield, N.J.)
Filed Mar. 8, 1963, Ser. No. 263,762
8 Claims. (Cl. 222—499)

This invention relates to closures for bottles, jars and similar containers, and more particularly to screw-type plastic closures intended for this purpose.

With the development of practical plastic materials, metallic screw closures have in general been wholly replaced by the plastic variety. In recent years, as still newer materials were introduced in the market, closures constituted of resilient or yieldable plastic substance such as polyethylene and similar formulations came into widespread use. The reasons for this involved not only the increased durability of such plastic materials, but also improved molding techniques and the development of designs by which it was not necessary to adhere to close tolerances.

Thus, yieldable plastic closures of both the screw-type and the snap-on type have replaced earlier closures constituted of rigid plastic substance, which latter were subject to cracking and breakage due to aging or under conditions of stress, shock and the like.

Use has also been made of yieldable plastic such as polyethylene and the like, to produce closures in which the operable or cap part has been held captive on the closure body, such cap part being shiftable between extended, non-sealing and retracted, sealing positions while being carried by the closure body.

While in general the development of these newer caps and closures has represented an improvement over the prior articles, there were still drawbacks in certain respects. For example, the screw-type captive cap involved relatively costly operations in removing it from the mold cavities, and also in applying it to the bottle or other container so as to seal or close the latter. The snap-type captive caps, while removing the disadvantages of costly stripping and assembling operations, were not especially easy to manipulate by the consumer.

The above drawbacks and disadvantages of prior molded plastic caps are obviated by the present invention, and one object of the invention is to provide a novel and improved resilient plastic cap construction of the screw type, which is at one and the same time extremely easy and convenient for the user to operate and also economical to mold and to apply to the container.

Another object of the invention is to provide an improved captive cap construction as above set forth, which is especially foolproof in its functioning whereby the user cannot inadvertently cause malfunctioning or breakage of the closure.

Still another object of the invention is to provide an improved captive cap type screw closure as characterized, wherein an especially good seal is had without involving close or critical tolerances in the fabrication of the parts.

A feature of the invention resides in the provision of an improved captive cap closure construction of the screw type in accordance with the foregoing, wherein effective sealing is had and malfunctioning and improper operation prevented while at the same time shallow helical thread means are utilized between the cooperable parts, such means being so arranged as to enable ready stripping of the molded parts from mold cavities and also permitting snap-on assembly of the parts without requiring relative turning, thus effecting economies in the manufacture and assembly.

Another feature of the invention resides in the provision of a novel combination of shallow helical thread means and stop devices, by which overriding of the thread means or malfunctioning is positively prevented, both for the operation of screwing on the cap or unscrewing the same.

Still another feature of the invention resides in the provision of a novel screw-type cap as above characterized, wherein the cap proper is yieldably held in its extended, non-sealing position against inadvertent dislodgement therefrom while the article is being put to use.

Yet another feature of the invention resides in the provision of an improved screw-type captive cap construction in accordance with the foregoing, wherein a desirable lubrication of cooperable sealing means is effected, when the container on which the cap is used has a liquid which possesses lubricating qualities.

Other features and advantages will hereinafter appear.

In the drawings accompanying this specification, similar characters of reference are used to designate like components throughout the several views, in which:

FIG. 1 is a view partly in side elevation and partly in axial section, showing the improved captive cap closure as provided by the invention. The cap portion is shown in extended, non-sealing position.

FIG. 2 is a fragmentary axial section of the closure, showing the cap in retracted, fully closed position.

FIG. 3 is a view like that of FIG. 2, but showing the cap in a position which is not quite fully closed but still effecting a seal.

FIG. 4 is a top plan view of the closure body of the closure construction.

FIG. 5 is a fragmentary side elevational view of the upper portion of the closure body, with the cap removed.

FIG. 6 is a top plan view of the cap per se.

FIG. 7 is a bottom plan view of the cap per se.

FIG. 8 is a fragmentary axial sectional view of the lower portion of the cap.

Referring now particularly to the figures, the closure construction as illustrated therein comprises essentially two separate parts or pieces, a main closure body designated generally by the numeral 10, and a captive cap indicated at 12. The closure body 10 has a cup-like mounting portion 14 which is very similar to the ordinary plastic screw cap, and further has an upstanding hollow spout portion 16 which is integral with the top surface or wall 18 of the mounting portion, being preferably disposed at the center of such wall.

The closure body 10 has a main axis X—X, and said body and the captive cap 12 are molded of a resilient and yieldable plastic substance, such as polyethylene plastic or similar formulations, whereby the resultant molded pieces are somewhat flexible and resilient yet retain a distinct shape and configuration as determined by the mold cavities.

The present invention involves a novel construction of the screw cap 12 and the upstanding tubular spout portion 16 of the closure body 10, by which a number of important features and advantages is had. These include economy in the molding of the two parts, simplicity and low cost of the molding equipment, with an economical assembly of the parts to each other and in a manner to effect a tight seal whereby the contents of the container will not leak out, smooth, easy and simple operation by the user when it is desired to dispense the contents of the container and to reseal the same, retention of the cap on the closure body whereby a captive characteristic is had, and a foolproof organization whereby improper operation of the closure and malfunctioning of or damage to the same is prevented even if an inexperienced user attempts to improperly operate the closure. The above objectives and features will become apparent as the description proceeds.

In addition to the generally flat top wall 18, the mounting or attachment portion 14 has a depending peripheral skirt 20 provided with internal screw threads 22 by which it may be attached to the threaded mouth 24 of a bottle 26 or other similar container.

The cap or closure construction as provided by the invention is intended to close and seal the container 26 in such a manner that liquid contents of the same will be prevented from leaking and instead may be readily dispensed by the simple procedure of unscrewing the captive cap 12, an operation which is normally familiar to most consumers. Where the liquid contents of the container 26 have a lubricating characteristic, use is made of this quality by the present improved closure construction, to effect a smoother operation, as will be later brought out in detail.

The spout portion 16 of the closure body comprises a frusto-conical wall or base 28, from which there extends in an upward direction a tubular extension 30 of reduced diameter, such extension, in accordance with the invention, being provided on its exterior with a shallow helical thread 32 which is of such small height that the closure body, by virtue of the yieldability of the plastic molding material, may be readily stripped from the mold cavity without requiring rotary movement. In consequence, the mold equipment and the stripping means are of simplified construction by which costs may be appreciably reduced.

Extending upward from the extension 30 of the spout portion is a tubular nozzle portion 34 in which there is carried a closure stem or peg 36, such peg being supported by a spider 38 to enable liquid to be discharged through the orifice 34 past and around the peg 36 (and through the spider 38).

Further, in accordance with the invention, at the lip or rim 40 of the nozzle portion 34 there is provided an external annular sealing and detent bead 42 which has a sloping undersurface 44 and is arranged in such a manner that it, also, will readily permit stripping of the closure body 10 from the mold cavity without any rotary motion being required. The tubular wall of the nozzle portion 34 is substantially cylindrical, with only a slight draft as required for molding procedures, and the same is true of the tubular extension 30 of the spout portion.

As thus constituted and organized, the closure body 10 may be readily fabricated in conventional molds, by simple molding techniques and procedures commonly utilized in the closure art.

The captive cap 12 is generally of frusto-conical configuration, having an annular wall 50 of such shape and having a transverse top wall 52 provided with a central orifice or opening 54. The discharge opening or orifice 54 has a conical wall 56 and also a straight or cylindrical wall 58, these being separated by an annular sharp bead or shoulder 60 and the arrangement being such that when the cap 12 is screwed downward the sealing peg 36 will be accommodated in the discharge opening 54 and an effective seal will be had at the bead or shoulder 60 because of an interference fit provided between the same and the peg 36. Such a seal is characterized by substantially radially-directed forces or pressures, and in accordance with the invention two additional seals characterized in the same manner are provided between the captive cap 12 and the nozzle or orifice portion 34 of the spout. One of said seals comprises an annular depending flange or bead 62 provided with an outer annular bead 64 arranged to sealingly engage the inner surface or bore of the nozzle portion 34 of the spout.

Additionally, the annular outer bead 42 of the spout is arranged to sealingly engage the inner surface 68 of the cap 12, to provide a third seal between the cap and the spout. As already mentioned above, all three seals are characterized by substantially radial pressures or forces, as distinguished from cooperable sealing surfaces which are brought together axially and experienced substantially axial or longitudinal forces or pressures.

The captive cap 12 is further provided with an internal annular detent bead or shoulder 70 which is adapted to engage the sealing bead 42 for the purpose of holding the cap captive on the spout portion, as illustrated in FIG. 1.

For cooperation with the helical thread 32 of the spout portion, the cap 12 is provided with an internal mating shallow helical thread 72 which has such little height as to enable the cap to be stripped with a straight-line movement from the mold cavity, without involving any rotary motion. Accordingly, simplicity in the construction of the mold cavity and stripping mechanism is achieved. The heights of the sealing and detent beads 60, 64 and 70 of the cap are also sufficiently small to enable such longitudinal stripping to be effected, in conjunction with the yieldability of the plastic molding substance.

By the invention, when the cap 12 is in the extended nonsealing or dispensing position shown in FIG. 1, the helical thread 72 on the cap is out of engagement with the helical thread 32 on the spout, and accordingly the user may continue to turn the cap without causing the thread to override each other or to effect any axial movement. In connection with such action, a slight taper is provided on the internal sealing surface 68 of the cap whereby a smaller diameter is disposed at the top and a larger diameter at the bottom of such surface. The effect of this is to cause the cap to be yieldably held in its extended, dispensing position as shown in FIG. 1 under the actions of the forces existing between the sealing bead 42 and the interior wall of the cap 12. Such detent action is relatively slight, but sufficient to normally hold the cap 12 in extended position, enabling the dispensing of the contents of the container to be continually effected without the annoyance of having the cap become inadvertently retracted, and without looseness of the cap being present. This yieldable detent action is also sufficient to automatically shift the cap 12 to its extended position upon disengagement of the thread 72 from the thread 32.

With the construction as above set forth, when the user desires to seal the closure, he merely grasps the cap 12 and gently pushes it inward or downward while at the same time imparting a tightening turning movement thereto. This will effect engagement of the threads 72 and 32, and continued tightening rotary movement will advance the cap 12 downward to bring it into full sealing engagement with the spout, as illustrated in FIG. 2. For such position, three seals are effective, involving respectively the sealing beads 42, 64 and 60, as explained above.

Further, in accordance with the invention, overriding of the shallow threads 72 is prevented by the provision of an advantageous stop means between the cap 12 and spout portion of the closure body 10, whereby a positive halting of the cap is effected when it has been turned down and attains the fully sealed position of FIG. 2. Such stop means comprises a pair of oppositely disposed curved and inclined projections 76 provided on the closure body 10 between the portions 16 and 30 thereof, and a pair of cooperable oppositely disposed shoulders 78 on the captive cap 12. As the cap 12 is screwed down to the sealing position, the shoulders 78 will come into engagement with end surfaces 80 of the curved projection 76, halting the cap in exactly the fully closed position. Such stop means comprises an important feature, in conjunction with the shallow threads 72, 32, inasmuch as it prevents any stripping or overriding action which would normally occur with shallow threads if continued turning force is applied to the cap.

In accordance with the invention, by making the helical threads 32, 72 shallow or not very high, and by rounding such threads, these may be forced past each other to enable the cap to be axially shifted without any rotary movement, from its extended non-sealing or dispensing position to a sealing position which might be either the fully closed position of FIG. 2 or else a partially closed position as illustrated in FIG. 3. The yieldability of the plastic material, in conjunction with the slight height of the cooperable helical threads enables this action to be readily effected, and there is thus eliminated the necessity for any rotary movement in assembling the cap to the closure body and shifting the cap into a sealing position which is satisfactory to enable storage and shipment of the container without leakage occurring. Thus, economy is effected in the assembly of the cap to the closure body, since this may be carried out by a simple straight-line movement as distinguished from a rotary or turning movement, and this is an important feature of the invention.

Further, in accordance with the invention, the sealing beads 60 and 64 are so related to the stop means 76, 78, 80 that when the cap 12 is pushed axially downward on the spout toward its retracted sealing position, such beads will effect a seal even through the stop means prevents the cap from becoming fully seated. For example, the stop means might be such as to enable the cap to be only retracted to within 1/16 of an inch of its fully retracted position, and such condition is illustrated in FIG. 3. However, even for such position, the aforementioned beads will effectively seal the closure and prevent leakage of fluid or liquid from the container.

Moreover, by the provision of the relatively shallow helical threads 32 and 72, the cooperable annular sealing surfaces between the cap 12 and the spout portion of the closure body 10 may be devoid of any parting lines but instead may be perfectly smooth and regular, whereby the sealing action will be most effective.

By virtue of the fact that the three seals which are provided are all characterized by radial forces or pressures as distinguished from axially acting pressures as almost universally used in the closure field prior to the advent of yieldable plastics, it is not necessary for the helical threads 32, 72 to do any appreciable amount of work in advancing the cap downward as it is being screwed and tightened by the user. The engagement between the various sealing beads and the cooperating sealing surfaces is of a soft nature or character because of the yieldability of the plastic substance; notwithstanding this, fairly appreciable radial sealing pressures may exist while at the same time relatively little force is required in effecting an axial shifting of the cap under the action of the helical threads 32, 72. Accordingly, relatively shallow threads may be successfully employed in this closure to effect such shifting to seal the cap, since but little work is required of them while yet obtaining effective sealing pressures. Therefore, the advantage of the shallow threads in enabling quick and easy stripping of the molded parts from the mold and in enabling quick assembly of the cap onto the closure body by a straight-line axial or longitudinal movement, is made possible without adversely affecting the sealing qualities of the closure.

As already mentioned above, upon engagement between the sealing beads 42 and the detent bead 70 of the closure body and cap respectively, the cap is held captive on the closure body and prevented from being removed unless excessive force is exerted. Since the cap 12 may be continually turned with the threads 32, 72 out of engagement, no judgment is necessary on the part of the user as regards the extent of turning which must be done to open the cap, and this same is true with respect to the stop means when the cap is being turned to close it. The stop means will provide a strong deterrent to further turning, apprising the user of the fact that the cap has been fully seated and placed in sealing position. Because of the radially-acting sealing beads, no critical tolerances are involved in the fabrication of the cooperable parts of the closure construction, whereby further economies in fabrication are effected.

Referring to FIG. 2 of the drawings, when the cap 12 is being screwed down to the retracted sealing position, a certain amount of liquid will be trapped outside of the sealing bead 64 and around the lip or rim 40 of the nozzle portion 34. Such liquid, if it has a lubricating quality, will effect lubrication at the sealing bead 64 and also the sealing bead 42, resulting in a smoother action of the closure as it is being operated.

It will now be understood from the foregoing that I have provided a novel and improved closure construction involving a captive screw cap, wherein the parts may be economically molded in simple mold equipment and quickly and easily assembled at the lowest possible cost, such cap construction being especially foolproof in its operation, providing an effective seal to prevent leakage of the liquid contents of the container, and employing a simple universally understood tightening and loosening turning action on the part of the user, without requiring the exercise of any judgement whatsoever.

Variations and modifications may be made within the scope of the claims, and portions of the improvement may be used without others.

I claim:

1. A closure construction for a container, comprising in combination:
   (a) a closure body having a main axis and also having a discharge passage,
   (b) a screw cap turnably carried on said closure body and movable axially thereon between an extended non-sealing position and any of a plurality of different retracted sealing positions, said different positions being characterized by the cap being disposed at different locations along the said main axis of the body,
   (c) cooperable telescoping annular sealing means on said closure body and screw cap, exerting mainly radial pressures to fully seal the closure body against dispensing when the cap is in any one of the said plurality of sealing positions, and
   (d) two cooperable helical thread means respectively on the closure body and cap, for axially shifting the latter to any of said sealing positions in response to its being turned, at least one of said thread means being yieldable to enable the other thread means to be forced past it whereby the cap may be axially snapped onto the closure body to any one of the said retracted positions without requiring it to be turned.

2. A closure construction as in claim 1, wherein:
   (a) the closure body and screw cap are flexible and constituted of resilient and yieldable plastic material, and
   (b) both of said thread means are yieldable to enable the cap to be snapped on axially.

3. A cap construction as in claim 1, wherein:
   (a) the helical thread means and annular sealing means are devoid of mold-parting lines whereby the sealing means may have smooth and unbroken cooperable surfaces to effect a tight seal.

4. A cap construction as in claim 1, and further including:
   (a) means normally holding said cap against removal from the closure body when in said non-sealing position while at the same time permitting turning of the cap,
   (b) said cooperable helical thread means on the closure body and cap being inoperative for the non-sealing position of the cap to permit free turning thereof for said position.

5. A cap construction as in claim 4 and further including:
   (a) means operative when the cap is in extended non-sealing position, for yieldably holding it therein.

6. A closure construction as in claim 1, and further including:
   (a) cooperable rotary stop means on the closure body and cap, preventing further turning of the latter in a tightening direction when it has reached an extreme retracted sealing position by being turned thereto.

7. A closure construction as in claim 6, wherein:
(a) the rotary stop means comprises a pair of oppositely disposed curved and inclined projections on the closure body and a pair of oppositely-disposed shoulders on the screw cap.

8. A closure as in claim 6, wherein:
(a) the said stop means, for certain rotative positions of the cap, halts the latter short of its extreme retracted sealing position when the cap is snapped onto the closure body by axial movement,
(b) three pairs of cooperable telescoping annular sealing means are provided on said closure body and screw cap, each of said pairs exerting mainly radial pressures to seal the closure body when the cap is in any of said sealing positions,
(c) all three pairs of sealing means being operative when the cap is thus halted.

References Cited by the Examiner
UNITED STATES PATENTS

| | | | |
|---|---|---|---|
| 521,491 | 6/94 | Arper | 222—568 X |
| 2,792,975 | 5/57 | Yorker | 222—498 |
| 2,851,252 | 9/58 | Le Bus | 255—28 |
| 2,998,902 | 9/61 | Thomas et al. | 222—499 |
| 3,033,428 | 5/62 | Van Baarn | 222—520 X |

LOUIS J. DEMBO, *Primary Examiner.*

EVERETT W. KIRBY, *Examiner.*